United States Patent [19]

Manheimer et al.

[11] 4,421,713
[45] Dec. 20, 1983

[54] TOKAMAK PLASMA HEATING WITH INTENSE, PULSED ION BEAMS

[75] Inventors: Wallace M. Manheimer, Silver Spring, Md.; Niels K. Winsor, Alexandria, Va.

[73] Assignee: The United States of America as represented by the Secretary of the Navy, Washington, D.C.

[21] Appl. No.: 247,420

[22] Filed: Mar. 25, 1981

[51] Int. Cl.$^3$ ............................................... G21B 1/02
[52] U.S. Cl. .................................... 376/127; 376/128; 376/143
[58] Field of Search .............................. 376/127-130, 376/133, 143

[56] References Cited

U.S. PATENT DOCUMENTS

| | | | |
|---|---|---|---|
| 3,831,101 | 8/1974 | Benford et al. | 376/130 |
| 4,065,351 | 12/1977 | Jassby et al. | 376/130 |
| 4,115,191 | 9/1978 | Ott et al. | 376/128 |
| 4,246,067 | 1/1981 | Linlor | 376/129 |

OTHER PUBLICATIONS

Nsenao 58 No. 2, 10/75, pp. 107, 108, 116-118, Steiner.
Nuclear Fusion vol. 17, No. 5, 1977, pp. 1057-1065, Ott et al.

*Primary Examiner*—Harvey E. Behrend
*Attorney, Agent, or Firm*—Robert F. Beers; William T. Ellis; Alan P. Klein

[57] ABSTRACT

An intense, space-charge-neutralized, pulsed ion beam is used to heat a magnetically-confined plasma, such as a tokamak plasma, by injecting the ion beam into the plasma along a trajectory that is generally tangential to the confining magnetic field. The ion beam inductively generates a plasma return current so that no net current is produced. As the ion beam drifts in the plasma, the confining magnetic field is transformed into one which can trap the ion beam at the center of the plasma. Once the ion beam is trapped, the plasma return current is cancelled by transformer action to produce a net current which is carried by the ion beam alone. The beam transfers its energy to the plasma by classical collisions with the electrons and ions of the plasma. Heating of the plasma can be sufficient to produce a breakeven condition or ignition.

5 Claims, 4 Drawing Figures

TOKAMAK PLASMA HEATING WITH INTENSE, PULSED ION BEAMS

BACKGROUND OF THE INVENTION

This invention relates in general to methods and apparatus for transferring energy to a magnetically confined plasma. More particularly, this invention relates to a method and apparatus for heating a tokamak-confined plasma to thermonuclear temperatures by injecting an intense, pulsed, space-charge-neutralized ion beam into the plasma.

Various techniques of heating tokamak-confined plasma have been proposed in controlled thermonuclear fusion research in an effort to provide an ionized gaseous plasma of sufficient density and temperature to sustain fusion reactions. Heretofore such reactor conditions have not been attained because insufficient heating, plasma-confinement instabilities, and energy-loss mechanisms prevent the plasma from reaching the required temperatures.

It is generally agreed that ohmic heating by the main plasma current is ineffective near reactor temperatures because the plasma resistivity is a sharply decreasing function of temperature. Present-day experiments show that ohmically heated tokamaks fall far short of reactor temperatures.

Since ohmic heating is insufficient, supplementary heating is required and techniques such as heating with neutral beams, microwave power and intense electron beams have been proposed. It is necessary that the power produced by these supplementary techniques be deposited near the center of the reactor plasma so that the energy is confined in the plasma and does not escape out of the plasma to the walls of the tokamak, thus introducing impurities from the wall into the system. These impurities, at best, cause inefficient heating and may even result in the cooling of the confined plasma.

The injection of neutral beams into the confining magnetic field is recently regarded as the most promising method of supplementary heating. However, neutral beams can only be efficiently produced for energies less than 160 keV for deuterons (80 keV for protons). Considerably larger energies are needed if the neutral beam is to be deposited near the center of the reactor plasma. Microwave power can be delivered to the tokamak by waveguides attached to opening in the side walls, or by large coil structures inside the main vacuum chamber. This approach is limited by difficulty in controlling where in the plasma the microwave power is deposited, and also by anomalous scattering or anomalous absorption of the microwave power in the outer regions of the plasma due to parametric instabilities.

The injection of intense pulsed electron beams is a possible means of heating tokamak plasma. However, the time required for relativistic electrons to deposit their energy into a plasma is very long so that some anomalous stopping of the beam must be invoked. This is very speculative and, even if there is an anomalous stopping, there may also be associated energy loss from the plasma. For instance, experiments have shown that discharges with runaway electrons can be very destructive to tokamak liners.

In ohmic heating, heating with neutral beams and heating with microwave power, the tokamak current is driven, i.e., the plasma is the secondary of a transformer whose flux runs through the cneter of the tokamak. This current-control system represents a very large part of the cost and complexity of a tokamak.

SUMMARY OF THE INVENTION

It is therefore an object of the present invention to heat a reactor plasma and cause ignition thereof.

Another object is to heat a reactor plasma by injecting an intense, pulsed, space-charge-neutralized ion beam into the plasma.

Briefly, in accordance with the invention, a high density, full volume plasma is produced and fills a reactor wherein it is confined by a magnetic field. An intense, pulsed ion beam is then injected into the plasma, inductively generating a plasma return current so that no net current is produced. As the ion beam drifts in the plasma, the confining magnetic field is changed to one which can trap it at the center of the plasma. When the beam is trapped, the plasma return current is cancelled by transformer action, giving rise to a net current carried by the ion beam alone. Classical collisions with the ion beam heat the plasma electrons and ions, and this heating can be sufficient to produce ignition.

The present invention has the advantage that ion beams can be produced efficiently over a wide range of voltages and currents and are characterized by enormous power and very short delivery time.

Additional advantages and features will become apparent as the subject invention becomes better understood by reference to the following detailed description when considered in conjunction with the accompanying drawings wherein:

DESCRIPTION OF THE PREFERRED EMBODIMENT

In the present invention, an intense, space-charge-neutralized, pulsed ion beam is utilized to heat a tokamak plasma. The term "space-charge-neutralized" is used herein to indicate that the intense ion beam contains an equal number of ions and electrons (although the electrons may be of much lower energy than the ions) so that the ion beam used in the present invention may be thought of as an intense, neutral, plasma beam. The intense ion beam is injected into the tokamak and the beam transfers its energy to the plasma by inelastic collisions with the electrons and ions of the plasma.

Figure 1:
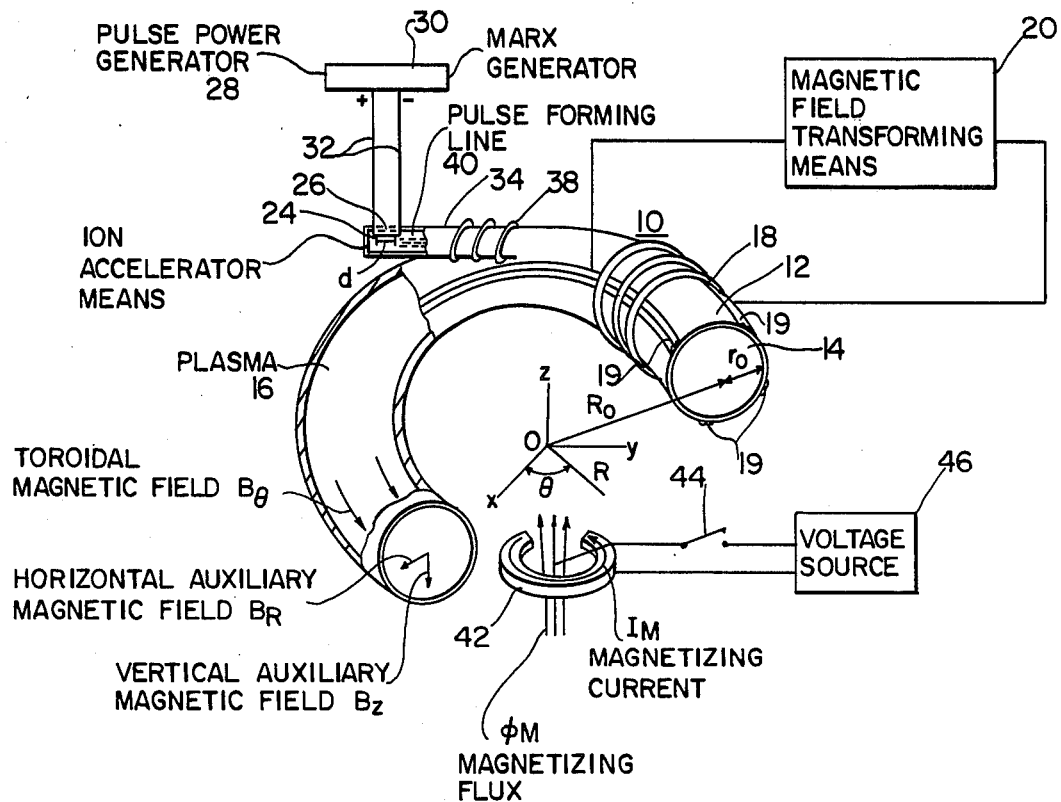
FIG. 1 is an isometric, partially cut-away, view of a typical tokamak magnetic field apparatus showing the ion-beam injection system in accordance with the present invention.

Referring now to the drawing, wherein like reference characters refer to like or corresponding parts throughout the several views, and more particularly to FIG. 1, there is illustrated an isometric, partial cut-away view of an apparatus for heating a tokamak-confined plasma to thermonuclear temperatures. A basic tokamak magnetic field apparatus 10 includes a toroidal shell 12 defining an endless chamber 14. The chamber 14 is evacuated to a high vacuum and thereafter a high-density, full volume plasma 16 (hereinafter also referred to as the tokamak plasma) of major radius $R_o$ and minor radius $r_o$ is established in the chamber, by means not shown. The tokamak plasma 16 is confined within the toroidal shell 12 in a magnetic field B created by the superposition of a strong, externally generated toroidal (longitudinal) field $B_\theta$ and a much smaller auxiliary (transverse) field consisting of a vertical component $B_Z$ parallel to the axis of revolution of the toroid, and a horizontal component $B_R$ radiating from the axis of revolution of the toroid (the characters B, $B_\theta$, $B_Z$, and $B_R$ are used herein to denote the vector magnetic fields, and a cylindrical coordinate system is assumed with origin on the axis of revolution of the toroid). A toroidal winding 18, energized by a direct current source, not shown, establishes the toroidal magnetic field $B_\theta$, while longitudinal coils 19, also energized by a direct current source, not shown, establish the auxiliary field. Means 20 is provided for transforming the magnetic field B to one which can trap a space charge-neutralized ion beam at the center of the plasma. Specifically, the magnetic field-transforming means 20 may be such as can transform the auxiliary field from one whose direction is purely parallel to the axis of revolution of the toroid to a betatron field having both vertical and horizontal components. While such means may conveniently take a variety of forms which are well known to those skilled in the art, it may take the form, for example, of a set of switches for enabling desired sets of longitudinal coils 19 to be switched in and out of electrical connection with the direct current source such as described in "Betatrons With and Without Iron Yoke", A. Bierman and H. A. Oele, Phillips Technical Review 11, 65 (1949) or "High Current Ironless Betatrons", A. I. Pavlovskii, et al., Sov Physics Doklady 10, 30 (1965). No plasma current is carried by the tokamak plasma.

In order to heat the tokamak plasma by injecting a space-charge-neutralized, pulsed ion beam into the tokamak plasma, four things must be accomplished: first, an ion beam having the required characteristics must be produced (these characteristics will be explained hereinafter); second, the ion beam must propagate to the tokamak, third, the ion beam must be trapped by the tokamak plasma; and fourth, the beam must transfer its energy to the plasma in a time comparable to, or less than, the plasma energy containment time.

Considering first the production of an ion beam having the proper characteristics, in general an electron beam and an ion beam may be generated in an ion accelerator which includes an anode and a cathode separated by an anoe-cathode gap and in which the anode and cathode are capable of emitting ions and electrons, respectively. Until recently, the ratio of power delivered to the ion beam to the power delivered to the electron beam was low; however, advances in ion accelerators have greatly increased the portion of the energy delivered to the anode-cathode gap which goes to producing the ion beam.

Referring still to FIG. 1, the present invention includes a pulsed ion-accelerator means 22 of the type capable of producing an intense, space-charge-neutralized ion beam. A reflux triode, reflux tetrode, a pinched electron diode or magnetically insulated diode is suitable for use as ion-accelerator means 22. Typically, ion-accelerator means 22 will include an anode 24 and a cathode 26 separated by an anode-cathode gap d. The ion-accelerator means 22 is energized by a pulsed power generator 28 which typically includes a capacitor bank connected in the form of a conventional Marx generator or pulse transformer 30 and a conventional pulse-forming line 32. Marx generator 30 provides the high voltage necessary to generate the intense ion beam and pulse-forming line 32 provides rapid delivery of the energy to the ion-accelerator means 22. Ion-accelerator means 22 and pulsed power generator 28 are well known in the art and are disclosed in U.S. Pat. No. 4,115,191 hereby incorporated by reference.

The ion-accelerator means 22 is situated in a guide tube 34 which leads to an opening 36 (see FIG. 2) in a side wall of the tokamak shell 12. The guide tube 34 is attached nearly tangent to the side wall. The ion accelerator means 22 and the guide tube 34 are subjected to a longitudinal magnetic field $B_G$ generated by guide tube winding 38 (energized by a direct-current supply not shown).

The operation of the ion-accelerator means 22 will now be briefly described. Upon being energized by the pulsed-power generator 30, an ion current is drawn from anode 24 and passes through the cathode 26. The ion accelerator means 22 is designed so that the ion beam-to-electron beam current ratio is enhanced by preventing the generation of electron current. The ion beam, represented by dashed lines 40, emerging from the cathode 26 is neutralized by electrons dragged off plasma which has been formed on the outside surface of the cathode. In the case of an ion accelerator having a planar anode-cathode gap d (in centimeters) with an applied voltage V (in megavolts), according to the Langmuir-Child law, the ion-current density produced (in amperes/cm$^2$) is $$j_{LC} = \frac{(1.85)(4)}{9} \epsilon_o \left(\frac{2e}{M}\right)^{1/2} \frac{V^{3/2}}{d^2} \text{ or } j_{LC} = 60 \frac{V^{3/2}}{d^2}$$

where
$\epsilon_o$ is the permittivity of free space,
M is the mass of a proton (in MKS units), and
e is the charge of a proton (in MKS units, if it is assumed that no electrons are present in the gap. In fact, the presence of electrons in the gap d allows the possibility that the space-charge-limited ion current can be enhanced by a factor a ($a = j_i/j_{LC}$, where j is the actual current density). For example, reflex triode operation with enhancement factors of approximately 100 has been observed.

Figure 2:
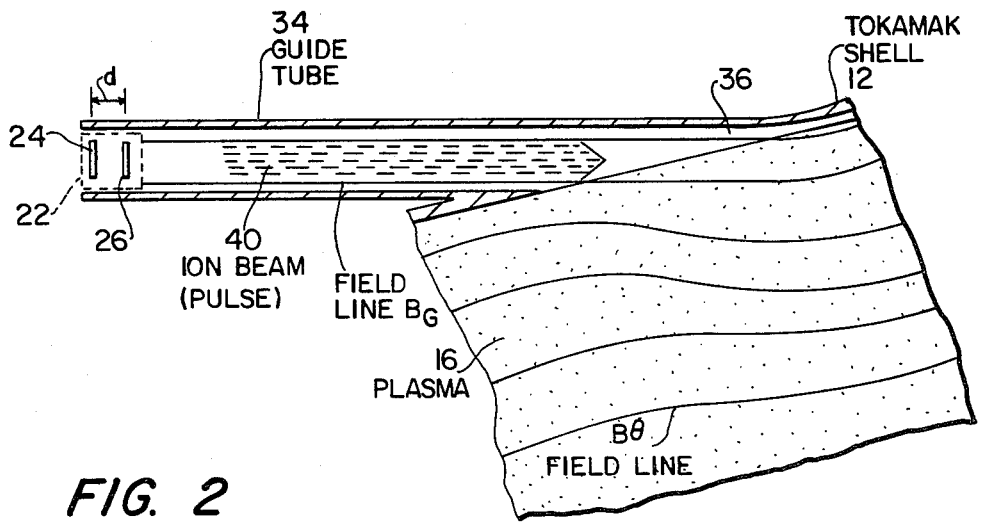
FIG. 2 is a cut-away elevation view illustrating the magnetic field lines in the guide tube and the tokamak of FIG. 1.

Considering now the injection of the space-charge-neutralized ion beam 40 into the tokamak 10, reference is made to FIG. 2. The pulsed ion-accelerator means 22, such as a reflux triode, is shown situated in the guide tube 34 which leads to the opening in the top wall of the tokamak shell 12. If the vacuum requirements for the ion source and tokamak are different, a thin foil transparent to the beam can be placed somewhere in the guide tube or else at the opening between guide tube and tokamak. The ion beam 40 emerging from the anode 24 and passing through the cathode 26 (neutralized by dragging electrons from the cathode) will propagate down the guide tube 34. At the end of the guide tube 34, the magnetic field in the guide tube $B_G$ (as generated by guide tube winding 38) merges with the tokamak magnetic field B. The ion beam 40 propagating through the guide tube 36 into the tokamak enters the tokamak nearly tangential to the field lines.

Figure 3:
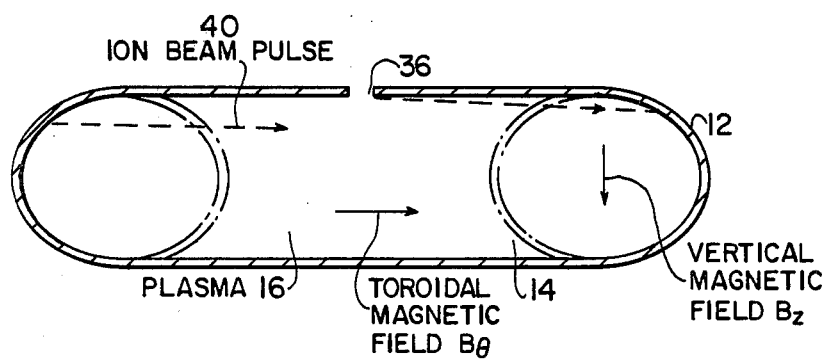
FIG. 3 is a cross-sectional view of the totamak of FIG. 1.

After the beam 40 has entered the tokamak it must be trapped by the tokamak plasma 16. Considering the trapping of the ion beam by the tokamak plasma, reference is made to FIG. 3 which shows the ion beam 40 entering the chamber 14 nearly tangential to the toroidal magnetic field lines. When the ion beam 40 passes into the tokamak 10, the ion beam current inductively generates an equal and oppositely directed plasma return current so that no net current is produced in the tokamak. Since there is no tokamak current, the ion beam responds only to the magnetic field B. Let it be assumed initially that the magnetic field transforming means 20 is inactivated and the auxiliary field has only a uniform vertical component $B_Z$, that is to say $B_Z$ is independent of R, $\theta$ and Z, and $B_R = 0$. The beam ions will have a large velocity component $V_\theta$ parallel to the toroidal field $B_\theta$ and a slow downward drift velocity component $V_Z$ parallel to $B_Z$ whose magnitude is given by $$V_Z \approx V_\theta \left( \frac{B_Z}{B_O} + \frac{V_\theta}{R_o \Omega_i} \right)$$

By controlling the uniform vertical field component $B_Z$ it is possible to optimize this process. Thus, for example, defining $$B_{ZO} = B_\theta \frac{V_\theta}{R_o \Omega_i},$$

if the uniform vertical field component is controlled such that $B_Z = -0.9\, B_{ZO}$ when the beam 40 is injected into the tokamak, 90 percent of the downward drift is cancelled out.

Figure 4:
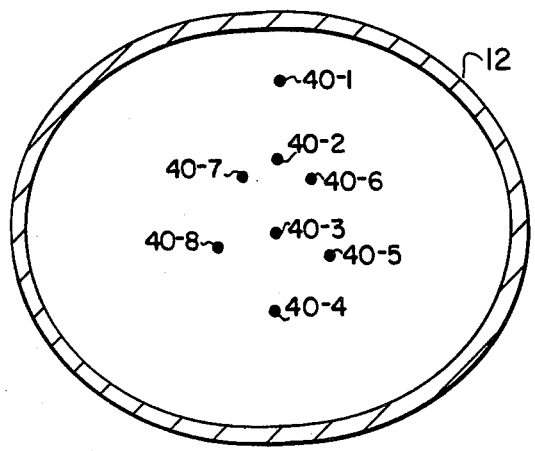
FIG. 4 is a cross-sectional elevational view of the toroid of FIG. 1.

In order to follow the beam 40 as it is deflected or drifts, FIG. 4 illustrates such drift. FIG. 4 is an elevational section of the toroidal shell 12 taken 90 degrees from the point of injection 36 of the ion beam 40. Beam 40, or more particularly, beam path 40 is shown in cross-section passing into the drawing after many transits around the toroid. The first transit of the beam immediately after injection is identified as beam 40-1, while the second, third, fourth, etc. transits are identified as beams 40-2, 40-3, 40-4, etc. respectively.

As the beam passes through the center of the toroidal shell 12 (beam 40-3), the downward drift is stopped by activating the magnetic field-transforming means 20. The transforming means 20 transforms the auxiliary field from one whose direction is purely parallel to the axis of revolution of the toroid to a betatron field having Z and R components which are respectively of the form $$B_Z = B_{ZO} \left(\frac{R_o}{R}\right)^n \text{ and } B_R = -\left(\frac{n}{R}\right) Z B_{ZO} \left(\frac{R_o}{R}\right)^n$$

where $0 < n < 1$. The magnetic field must be transformed with a time $\tau \leq r_o/V_Z$ so that the beam 40 does not reach the other side of the toroidal shell 12.

The betatron field traps the beam 40 at the center of the toroid shell 12. Referring again to FIG. 4, the beam is deflected upward (beam paths 40-5, 40-6, 40-7, etc.) so that an subsequent transits around the toroid its cross-section traces out an ellipse about the center of the shell. Specifically, if $n = \frac{1}{2}$, the cross-section of the beam traces out a circle with a rotational frequency $$= V_\theta \frac{B_{ZO}}{B_O R_o} [n(1-n)]^{\frac{1}{2}}.$$

Considering now the transfer of energy by the space-charge neutralized ion beam to the plasma, means may be provided for cancelling the plasma return current so that a net current is produced which is carried by the ion beam alone. While such means may take a variety of forms, conveniently it may take the form illustrated in FIG. 1 of primary windings 42 connected by a switch 44 to a voltage source 46. After the ion beam is trapped at the center of the plasma in the manner described, switch 44 is thrown to magnetically link primary windings 42 to the toroidal shell 12 and induce a plasma current by transformer action (the plasma acts as a transformer secondary winding). The current induced by transformer action is such as to cancel the oppositely directed plasma return current which had been inductively generated by the ion beam 40 when it first passed into the tokamak and to create a net tokamak current which is carried by the ion beam 40 alone. As the current-carrying ion beam slows down, it heats the electrons and ions by classical collisions. The total current does not decrease as fast as the ion beam current does, because of the inductance of the system. When the ion beam has finally lost all of its energy, the plasma is heated to a sufficiently high temperature that the current decays very slowly.

Reference is made to "The Transient Tokamak", Naval Research Laboratory Memorandum Report 4142 (December 1979) by the present inventors wherein it is shown that for a high field, high density plasma, a single pulse of ion beam energy (about 1 megajoule) is sufficient to reach ignition. Specifically, numerical solutions for the Alcator C device at MIT are shown in FIG. 1 therein. It is assumed that the plasma minor radius $r_o = 10$ cm, its major radius $R_o = 60$ cm, the plasma density $n = 10^{15}$ cm$^{-3}$ and $B = 160$ KG. A 5 megavolt, 1.5 megamp., 200 nanosecond tritium beam (of energy $E = 1.5$ megajoules) shot into a deuterium-tritium plasma causes the plasma to ignite and, after the numerical integration stops at $t = 1$ second, the energy multiplication factor (ratio of the output power derived from the fusion reaction to the input power required to heat the plasma) Q exceeds 12.

The ion beam heating approach has several advantages over ohmic heating. Chiefly, there is the enormous power of the beam. The 1.5 megajoules of beam energy is deposited in about 100 milliseconds representing an initial power dissipation of 15 megawatts. Secondary, before the beam slows down, it deposits the last bit of its energy into the plasma. In this case, it leads to an ion temperature increase of about 2 keV and this final boost leads directly to ignition.

Also, additional calculations show that for Alcator C, a derated beam (V = 2 Mev, I = 1 megamp.) and derated field ($B \approx 80$ KG) can give rise to $Q \approx 1$. Furthermore, ion beam heating can also give rise to breakdown on large volume tokamaks.

Although the present invention has been described with application to the heating of a tokamak-confined plasma, those skilled in the art will recognize that the present invention can be used with other fusion schemes in which a plasma is confined in a magnetic field, specifically, linear plasma-confining magnetic field devices (magnetic mirrors) or other toroidal confining devices such as tormak or surmac.

It is obvious that many modifications and variations of the present invention are possible in light of the above teachings. It is therefore to be understood that within the scope of the appended claims the invention may be practiced otherwise than as described.

We claim:

1. Apparatus for heating a plasma, the plasma being confined in an apparatus of the type wherein the plasma is confined in a vacuum chamber by a magnetic field, and no plasma current is initially carried by the plasma, comprising:

means for producing a space-charge-neutralized, pulsed, ion beam;

means for directing the ion beam into the plasma-confining chamber, means for transforming the magnetic field to one which can trap the ion beam at the center of the plasma; and means for cancelling a plasma return current inductively generated in the plasma by the ion beam current so that a net current is produced which is carried by the ion beam alone, and which is dissipated by the ion beam's transferring its energy to the plasma by classical collisions with the electrons and ions of the plasma.

2. The apparatus recited in claim 1 wherein:

the magnetic field-transforming means transforms the magnetic field to a betatron field.

3. The apparatus recited in claim 2 wherein the plasma return current-cancelling means includes:

primary windings spaced from the plasma-confining chamber for inducing a plasma current by transformer action.

4. A method for heating a plasma initially carrying no plasma current and confined in a magnetic field in a vacuum chamber, comprising the steps of:

(a) producing a space-charge-neutralized pulsed ion beam;

(b) injecting the beam into the plasma-confining chamber, the ion beam current inductively generating a plasma return current so that no net current is produced;

(c) transforming the magnetic field to one which can trap the ion beam at the center of the plasma; and (d) cancelling the plasma return current so that a net current is produced which is carried by the ion beam alone, and which is dissipated by the ion beam's transferring its energy to the plasma via classical collisions with the electrons and ions of the plasma.

5. The method recited in claim 4 where step (d) includes:

magnetically linking a primary winding to the plasma.

* * * * *